Dec. 8, 1953     C. G. HOWELL     2,661,858
PAINT RECEPTACLE

Filed April 8, 1952     2 Sheets-Sheet 1

INVENTOR.
Clarence G. Howell
BY
ATTORNEYS

Dec. 8, 1953  C. G. HOWELL  2,661,858
PAINT RECEPTACLE
Filed April 8, 1952  2 Sheets-Sheet 2
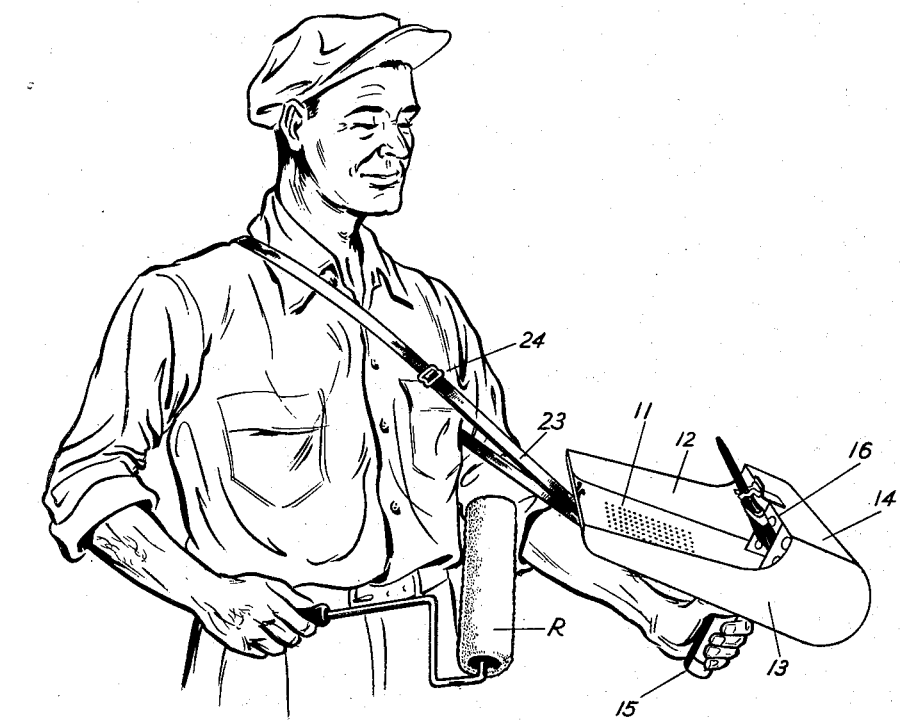
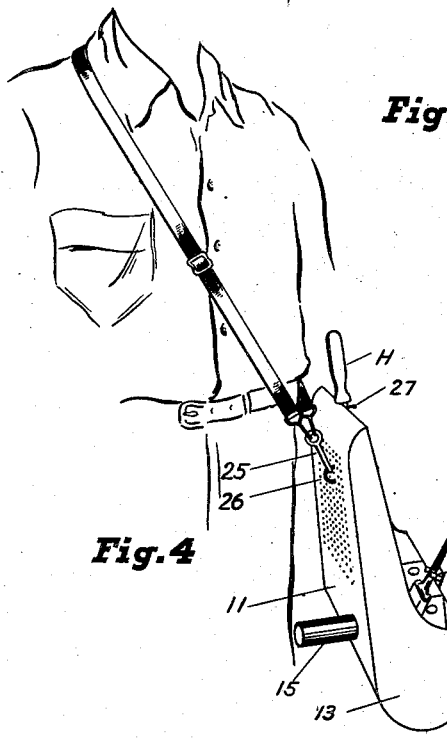
Fig. 3
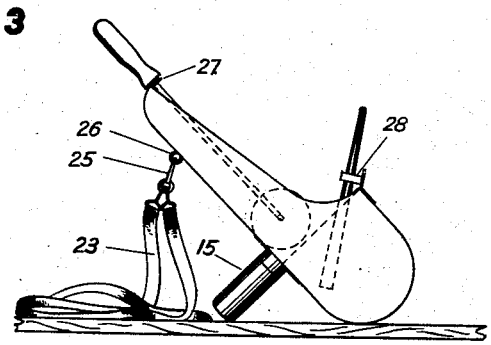
Fig. 4
Fig. 5
INVENTOR.
Clarence G. Howell
BY
*Corbett, Mahoney & Miller*
ATTORNEYS Patented Dec. 8, 1953

2,661,858

UNITED STATES PATENT OFFICE 2,661,858

PAINT RECEPTACLE

Clarence G. Howell, Columbus, Ohio

Application April 8, 1952, Serial No. 281,136

2 Claims. (Cl. 220—1)

My invention relates to a paint receptacle. It has to do, more particularly, with a paint receptacle, that is, a pan or tray, which is designed for use with roller-type paint applicators.

This application is a continuation-in-part of my copending application, Serial No. 204,799, filed January 6, 1951.

In my copending application, I disclose a paint receptacle of the general type indicated which is provided with a depending handle that facilitates handling of the receptacle so that it may be held by the painter in one hand as he uses the roller applicator with the other hand. This paint receptacle is provided with a hood at one end so that when the bottom is disposed substantially vertical, the hood provides a container for the paint, the paint running down the bottom into the container provided by the hood so that it will not dry or harden on the bottom. To use the receptacle again with the roller, it is merely necessary to tilt the receptacle back so that its bottom is inclined slightly from the horizontal towards the hooded end. The depending handle is so located on the bottom of the receptacle that when the receptacle is placed on a flat support, the receptacle is tilted towards the hooded end so that the paint will run into the container at such end. The receptacle in my said copending application is also designed to prevent excessive splashing of the paint upon movement of the receptacle during use of the roller applicator and upon movement of the applicator on the receptacle. Furthermore, the design is such that remixing of the paint occurs automatically during use of the receptacle.

The receptacle disclosed in my copending application has been found very satisfactory. However, on some jobs, especially professional jobs, it is desirable to use a very large receptacle or tray. I have found that in such cases, it is desirable to provide additional means for aiding in supporting the receptacle during use of the roller applicator therewith.

It is the main object of the present invention to provide a paint receptacle of the type indicated which has all of the advantages of the device disclosed in my copending application and is provided with additional means for aiding in supporting the weight of the receptacle during use of the roller applicator therewith.

Another object of my invention is to provide the additional supporting means which is so associated with the receptacle that the receptacle may be suspended from the shoulder of the painter during use of the roller applicator therewith in such a manner that in combination with the depending handle on the bottom of the receptacle, which is gripped with one hand, the receptacle may be supported easily in position for rolling the roller applicator with the other hand on the bottom thereof.

Still another object of this invention is to provide the suspending means for the receptacle and attach it to the receptacle in such a manner that when the applicator roller is not being used with the receptacle and the receptacle is merely suspended from the shoulder, it will hang in such a position that the hooded end thereof is lowermost and will receive the paint which will flow down the bottom of the receptacle into the container at the hooded end thereof, the receptacle thereby serving as a pail or container for normally carrying the paint without spilling.

Various other objects will be apparent.

The preferred embodiment of my invention is illustrated in the accompanying drawings wherein similar characters of reference designate corresponding parts and wherein:

Figure 3 is a perspective view showing how the supporting strap is used in combination with the handle which depends from the bottom of the receptacle.

Figure 4 is a diagrammatic view showing the position of the receptacle when it is allowed to hang freely by means of the supporting strap.

Figure 5 is a side elevational view showing the receptacle resting on a support in the tilted position it will occupy when not in use.

Figure 1:
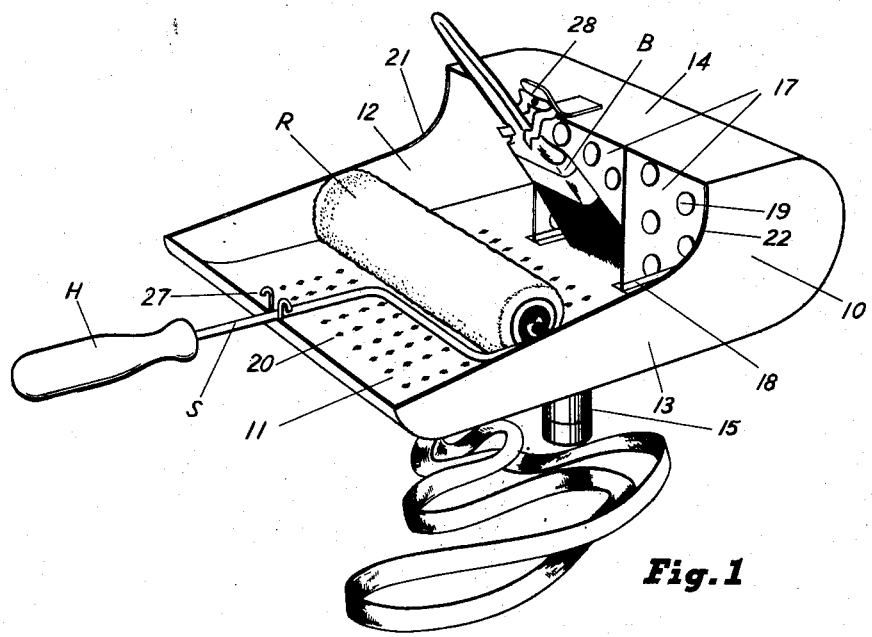
Figure 1 is a top perspective view of a paint receptacle made according to my invention showing an applicator roller associated therewith.

With reference to the drawings, in Figure 1 I have illustrated my invention as comprising a pan or tray 10 which includes the flat bottom 11, the side walls 12 and 13 and a hood 14 which is disposed over the rear end of the pan. The pan is formed of metal or other suitable rigid material and is of proper width to receive a roller applicator R of the usual type.

Depending from the bottom 11 of the pan and substantially perpendicular thereto is the handle 15. This handle is preferably attached to the bottom of the pan by means of a threaded joint indicated at 16 so that the handle can be removed to facilitate shipping. The handle is so located that the pan will be properly balanced when held in one hand, it being noted from Figure 3 that the handle is located substantially in alignment with the forward edge 16 of the top of the hood 14. Transversely the handle is located substantially at the longitudinal center line of the pan.

Figure 2:
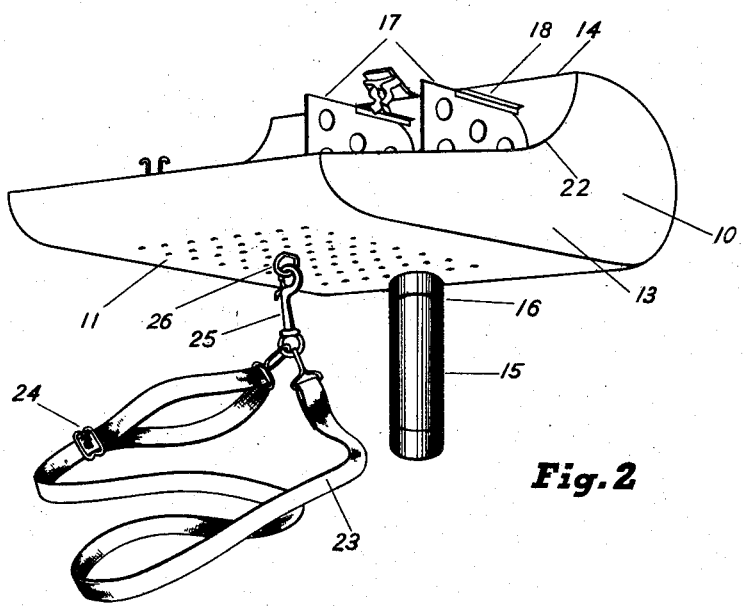
Figure 2 is a bottom perspective view of the receptacle showing how the supporting strap is attached thereto.

Between the hood 14 and the bottom 11 of the pan, a plurality of vertically disposed baffle 17 are provided. Any number of these baffles may be provided but I have shown only two. These baffles 17 are preferably removable and slip rearwardly into guides 18 carried by the hood and bottom of the pan. In Figure 1, I have illustrated these baffles in position and in Figure 2, I have illustrated them being removed. These baffles, when in position in the guides 18, are parallel with each other and with the side walls 12 and 13. Each baffle is provided with a plurality of openings 19 through which the paint may pass back and forth. This may be accomplished during movement of the roller R in the pan 10 or may be accomplished by rocking and tilting the pan and is useful in keeping the paint thoroughly mixed.

The bottom 11 may be provided with small upwardly pressed bosses or protuberances 20. These serve to cause a film of paint to remain on the bottom 11 even if the pan is tilted rearwardly momentarily and to prevent slipping of the roller when it is rolled along the bottom.

The side walls 12 and 13 may be provided with semi-circular fillets 21 and 22 where they join the hood 14 and upon which the roller may be slid axially to scrape off excess paint, if desired.

In addition to the handle 15 for supporting the pan, I provide a strap 23 by means of which the pan may be suspended from the shoulder of the painter as shown in Figure 3. This strap will be adjustable as to length by means of the usual buckle arrangement 24. The strap is attached to a snap hook 25 which may be snapped on a loop 26 on the bottom 11 of the pan. The location if this loop 26 is very important, it being noted in Figures 2, 4 and 5 that it is aligned with the handle 15 transversely of the bottom of the pan and is spaced forwardly thereof a substantial distance. In other words, it is transversely aligned with the handle 15 but is intermediate the handle and the forward or unhooded end of the pan.

When the pan is to be used, the hook 25 is snapped on the loop 26 and the strap 23 is placed around the shoulder of the painter as shown in Figure 3. Then with the left hand, the handle 15 is grasped and the pan is pushed outwardly keeping the strap 23 under tension, it being understood that the strap is supporting most of the weight of the pan. Then the roller applicator R can be grasped with the right hand and can be manipulated on the bottom 11 of the pan 10 which will be inclined towards the hooded end 14 and in a position where the roller applicator can be used thereon without strain to the painter. Most of the paint will remain in the hooded end 14 of the pan but the pan can be tilted forwardly from time to time by means of the handle 15 so that more paint will flow back onto the bottom 11. The handle 15 is preferably of such diameter that it can be gripped easily with the fingers, being fairly large in diameter for this purpose.

Not only does the strap 23 support the pan 10 for use as shown in Figure 3 but, as shown in Figure 4, it provides means for suspending the pan from the shoulder when the roller applicator is not in use. Because of the location of the loop 26, at this time the bottom 11 will be vertically disposed and the paint will run down into the hooded end 14 of the pan which will serve as a container or pail for the paint. The pan will automatically hang in this position whenever the handle 15 is released.

To prevent the roller from falling out of the pan when the pan is suspended as shown in Figure 4, I provide a U-shaped spring clip 27 at the forward or upper edge of the bottom 11 and midway between the sides 12 and 13. This clip 27 will receive the shank S of the roller and will be engaged by the handle H thereof, as shown in Figure 4, so that the roller will be suspended and retained in the pan. The hood 14 may have at its forward edge a spring clip 28 for supporting a touch up brush B.

The hook 25 can be actuated to release the pan easily and the painter can then support the pan on a scaffold or other flat surface as shown in Figure 5. The handle 15 will support the pan in tilted position on the flat support with the paint down in the hooded end 14 of the pan. At this time also the roller R will be suspended from the clip 27.

The baffles 17 will function, as in my copending application, to aid in keeping the paint mixed, since the paint will surge through the openings 19 whenever the pan is tilted. If a very small amount of paint is desired on the roller, it is merely necessary to slide or wipe the roller on either of the fillets 20 or 21. The roller R will always be prevented from entering the pool of paint in the hooded end of the pan by contact with the forward edges of the baffles 17. The hooded end will prevent splashing of the paint from the pan.

Various other advantages will be apparent.

Having thus described my invention, what I claim is:

1. A paint receptacle for use with a roller type applicator comprising a body for containing paint or the like having side walls and a bottom over which the rollers are rolled in applying the paint thereto, a hood at one end of the body joined to said side walls and said bottom and projecting forwardly over the bottom for a portion of the length thereof in spaced relationship thereto so that a container for the paint is provided by the hood when the bottom is disposed out of horizontal position with the hood lowermost, a flexible member for suspending the receptacle from the shoulder of a painter using the receptacle, means for attaching said member to the bottom of the receptacle midway between the sides thereof and forwardly of the center of gravity thereof, and a handle depending from said bottom and located in alignment with said attaching means but rearwardly thereof whereby when the receptacle is suspended from the shoulder by said flexible means the handle can be grasped with one hand and the receptacle can be pushed outwardly with the flexible member under tension to position the receptacle with the bottom inclined downwardly and outwardly away from the painter ready to receive the roller which can be grasped with the other hand by the painter and rolled along the bottom of the receptacle.

2. A paint receptacle according to claim 1 wherein the hood projects forwardly over less than half the length of the receptacle and the said handle depends from the bottom in perpendicular relationship thereto and is in substantial alignment with the forward edge of the hood.

CLARENCE G. HOWELL.

References Cited in the file of this patent

UNITED STATES PATENTS

| Number | Name | Date |
|---|---|---|
| 37,461 | Scott | Jan. 20, 1863 |
| 1,008,856 | Mosher | Nov. 14, 1911 |
| 1,643,189 | Urovsky | Sept. 20, 1927 |
| 2,444,584 | Touchett | July 6, 1948 |